United States Patent
Bikumala et al.

(10) Patent No.: US 10,437,660 B2
(45) Date of Patent: Oct. 8, 2019

(54) MACHINE SUGGESTED DYNAMIC REAL TIME SERVICE LEVEL AGREEMENTS IN OPERATIONS

(71) Applicant: Dell Products L.P., Round Rock, TX (US)

(72) Inventors: Sathish Kumar Bikumala, Round Rock, TX (US); Neha Wadhwani, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 15/594,168

(22) Filed: May 12, 2017

(65) Prior Publication Data

US 2018/0329768 A1 Nov. 15, 2018

(51) Int. Cl.
*G06F 11/07* (2006.01)
*G06N 20/00* (2019.01)
*G06N 5/02* (2006.01)

(52) U.S. Cl.
CPC ........ *G06F 11/079* (2013.01); *G06F 11/0709* (2013.01); *G06F 11/0751* (2013.01); *G06F 11/0775* (2013.01); *G06N 20/00* (2019.01); *G06N 5/02* (2013.01)

(58) Field of Classification Search
CPC .............. G06F 11/0709; G06F 11/079; G06F 11/0751; G06F 11/0775; G06N 99/005
See application file for complete search history.

(56) References Cited

U.S. PATENT DOCUMENTS

| | | | | |
|---|---|---|---|---|
| 6,173,053 B1 * | 1/2001 | Bogart | ................ | H04M 3/5233 379/265.02 |
| 8,767,948 B1 * | 7/2014 | Riahi | .................. | H04M 3/4936 379/266.08 |
| 2006/0069578 A1 * | 3/2006 | Borkowski | ............ | G06Q 10/00 705/1.1 |
| 2009/0089377 A1 * | 4/2009 | Rubinger | ............. | G06Q 10/107 709/206 |
| 2011/0276447 A1 * | 11/2011 | Paul | ....................... | G06Q 30/02 705/34 |
| 2011/0276912 A1 * | 11/2011 | King | ...................... | G06Q 10/00 715/771 |
| 2012/0323623 A1 * | 12/2012 | Sabharwal | ..... | G06Q 10/063112 705/7.14 |

(Continued)

*Primary Examiner* — Paul Contino
(74) *Attorney, Agent, or Firm* — Baker Botts L.L.P.

(57) ABSTRACT

Systems and methods for machine suggested dynamic real time service level agreements in operations may include a client information handling system and a ticketing information handling system having a ticketing processor subsystem. The ticketing processor subsystem may receive a problem ticket that may include a problem from the client information handling system. The ticketing processor subsystem may identify a learned problem profile, that may be based on the problem ticket, and learned analyst profiles associated with the learned problem profile. The ticketing processor subsystem may also determine a SLA estimation, that may be based on the learned problem profile and the learned analyst profiles. The ticketing processor subsystem may also send a SLA proposal that may include the SLA estimation and recommended analysts to the client information handling system.

20 Claims, 11 Drawing Sheets

(56) References Cited

U.S. PATENT DOCUMENTS

| | | | |
|---|---|---|---|
| 2014/0259170 A1* | 9/2014 | Amsler | H04L 63/20 726/23 |
| 2014/0278646 A1* | 9/2014 | Adrian | G06Q 10/063114 705/7.15 |
| 2015/0181038 A1* | 6/2015 | Fox | H04M 3/5175 379/265.06 |
| 2015/0295788 A1* | 10/2015 | Witzman | H04L 41/18 709/224 |
| 2015/0347950 A1* | 12/2015 | Goyal | G06Q 10/06393 705/7.39 |
| 2015/0348051 A1* | 12/2015 | Bodda | G06Q 30/016 705/304 |
| 2015/0350431 A1* | 12/2015 | Steiner | G06Q 10/10 379/265.03 |
| 2015/0350440 A1* | 12/2015 | Steiner | H04M 3/5232 379/266.01 |
| 2016/0112568 A1* | 4/2016 | Nowak | H04M 3/5233 379/265.05 |
| 2017/0168907 A1* | 6/2017 | Harper | G06F 11/2033 |
| 2018/0005246 A1* | 1/2018 | Basam | G06F 11/0709 |
| 2018/0276005 A1* | 9/2018 | James | G06Q 30/0269 |

* cited by examiner

700 ⟶  METHOD FOR BUILDING LEARNED PROBLEM PROFILES

CREATING, BY A TICKETING PROCESSOR SUBSYSTEM, A FIRST PROBLEM PROFILE PATTERN FOR THE PROBLEM OF THE PROBLEM TICKET THAT MAY BE BASED ON PROBLEM INFORMATION OF THE PROBLEM TICKET AND A CATEGORIZATION ALGORITHM — 702

DETERMINING, BY THE TICKETING PROCESSOR SUBSYSTEM, WHETHER THE FIRST PROBLEM PROFILE PATTERN HAS A KNOWN LEARNED PROBLEM PROFILE PATTERN THAT MAY BE ASSOCIATED WITH A KNOWN LEARNED PROBLEM PROFILE OF THE LEARNED PROBLEM PROFILE DATABASE, PRIOR TO THE IDENTIFICATION OF THE LEARNED PROBLEM PROFILE OF THE LEARNED PROBLEM PROFILE DATABASE — 704

ADDING, BY THE TICKETING PROCESSOR SUBSYSTEM, THE PROBLEM TICKET TO THE KNOWN LEARNED PROBLEM PROFILE, IN RESPONSE TO DETERMINING THAT THE FIRST PROBLEM PROFILE PATTERN MAY HAVE THE KNOWN LEARNED PROBLEM PROFILE PATTERN — 706

ADDING, BY THE TICKETING PROCESSOR SUBSYSTEM, A NEW LEARNED PROBLEM PROFILE THAT MAY HAVE THE PROBLEM TICKET AND THE FIRST PROBLEM PROFILE PATTERN TO THE LEARNED PROBLEM PROFILE DATABASE, IN RESPONSE TO DETERMINING THAT THE FIRST PROBLEM PROFILE PATTERN MAY HAVE AN UNKNOWN LEARNED PROBLEM PROFILE PATTERN — 708

FIG. 7

800 METHOD FOR BUILDING LEARNED ANALYST PROFILES

802 FOR EACH OF ONE OR MORE COMPLETED PROBLEM TICKETS IN AN OPERATIONAL DATABASE: RETRIEVING, BY A TICKETING PROCESSOR SUBSYSTEM, AN ASSIGNED ANALYST, ANALYST INFORMATION THAT MAY BE ASSOCIATED WITH THE ASSIGNED ANALYST, A KNOWN LEARNED PROBLEM PROFILE IN THE LEARNED PROBLEM PROFILE DATABASE THAT MAY BE ASSOCIATED WITH THE COMPLETED PROBLEM TICKET, AND PERFORMANCE METRICS THAT MAY BE ASSOCIATED WITH THE ASSIGNED ANALYST AND THE COMPLETED PROBLEM TICKET FROM THE OPERATIONAL DATABASE

804 ADDING, BY THE TICKETING PROCESSOR SUBSYSTEM, THE ANALYST INFORMATION, A CROSS-REFERENCE TO THE KNOWN LEARNED PROBLEM PROFILE, AND THE PERFORMANCE METRICS TO A LEARNED ANALYST PROFILE IN THE LEARNED ANALYST PROFILE DATABASE THAT MAY BE ASSOCIATED WITH THE ASSIGNED ANALYST

806 ORDERING, BY THE TICKETING PROCESSOR SUBSYSTEM, THE LEARNED ANALYST PROFILES THAT MAY BE ASSOCIATED WITH THE KNOWN LEARNED PROBLEM PROFILE FROM A HIGHEST RANK ORDER VALUE TO A LOWEST RANK ORDER VALUE TO CREATE THE RANK ORDERED LEARNED ANALYST PROFILES, THAT MAY BE BASED ON THE PERFORMANCE METRICS OF THE LEARNED ANALYST PROFILE, THE PERFORMANCE METRICS OF EACH OF THE OTHER LEARNED ANALYST PROFILES, AND A RANK ORDERING ALGORITHM

808 ADDING, BY THE TICKETING PROCESSOR SUBSYSTEM, A CROSS-REFERENCE OF THE LEARNED ANALYST PROFILE AND A CROSS-REFERENCE OF THE RANK ORDERED LEARNED ANALYST PROFILES TO THE KNOWN LEARNED PROBLEM PROFILE

FIG. 8

1000 METHOD FOR CREATING AN ORDERED LIST OF LEARNED ANALYST PROFILES

CREATING AN ORDERED LIST OF THE LEARNED ANALYST PROFILES THAT MAY BE ASSOCIATED WITH THE LEARNED PROBLEM PROFILE OF ANALYSTS THAT ARE AVAILABLE TO RESOLVE THE PROBLEM, THAT MAY BE BASED ON A RANK ORDERING ALGORITHM AND PERFORMANCE METRICS THAT MAY BE ASSOCIATED WITH EACH ANALYST AND EACH LEARNED PROBLEM OF THE LEARNED PROBLEMS OF THE LEARNED PROBLEM PROFILE — 1002

CREATING THE LIST OF THE PRE-DETERMINED NUMBER OF THE RECOMMENDED ANALYSTS OF THE LEARNED ANALYST PROFILES FROM THE PRE-DETERMINED NUMBER OF THE LEARNED ANALYST PROFILES OF THE ORDERED LIST THAT MAY HAVE THE HIGHEST RANK ORDER VALUES — 1004

FIG. 10

MACHINE SUGGESTED DYNAMIC REAL TIME SERVICE LEVEL AGREEMENTS IN OPERATIONS

BACKGROUND

Field of the Disclosure

This disclosure relates generally to information handling systems and, more particularly, to machine suggested dynamic real time service level agreements in operations for an information handling system.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be utilized to execute user applications. When a problem occurs during execution of a user application, a user may request help from customer support to resolve the problem. Typically, the user submits the problem to customer support and the problem gets assigned to the first analyst of a customer support team who becomes available. The amount of time to resolve a given problem depends on the analyst assigned and their level of expertise to solve the given problem. If the first analyst is unable to resolve the problem, another analyst may need to be re-assigned to the problem.

SUMMARY

In one aspect, a disclosed ticketing system may include a client information handling system and a ticketing information handling system coupled to the client information handling system, a learned problem profile database, and a learned analyst profile database of the ticketing system. The ticketing information handling system may include a ticketing processor subsystem that may be configured to receive a problem ticket that may include a problem and problem information that may be associated with the problem from the client information handling system. The ticketing processor subsystem may also be configured to identify a learned problem profile that may be based on the problem information of the problem ticket and a categorization algorithm. The ticketing processor subsystem may further be configured to identify learned analyst profiles of the learned analyst profile database that may be associated with the learned problem profile. The ticketing processor subsystem may also be configured to determine a service level agreement (SLA) estimation, based on the learned problem profile, the learned analyst profiles that may be associated with the learned problem profile, and a SLA estimation algorithm. The ticketing processor subsystem may further be configured to determine a list of a pre-determined number of recommended analysts of the learned analyst profiles. The ticketing processor subsystem may also be configured to send a SLA proposal that may be associated with the problem ticket to the client information handling system. The SLA proposal may include the SLA estimation and the list of the pre-determined number of recommended analysts, the categorization algorithm may be implemented by a categorization module, the SLA estimation algorithm may be implemented by a SLA estimation module, the ticketing processor subsystem may include the categorization module and the SLA estimation module, and the ticketing system may include the learned problem profile database and the learned analyst profile database.

In any of the disclosed embodiments of the ticketing system, the SLA estimation may be further based on an average resolution time of the problem, a product available time of product information of a product information database, an available time of each analyst of the learned analyst profiles, a resolution time of each analyst available to resolve the problem, user information that may be associated with a user and the problem ticket, and analyst information that may be associated with each analyst. The ticketing system may also include the product information database.

In any of the disclosed embodiments of the ticketing system, the ticketing processor subsystem may also be configured to retrieve the learned analyst profiles from a correlation database entry of a correlation database that may be associated with the learned problem profile, prior to the identification of the learned analyst profiles. The ticketing system may also include the correlation database.

In any of the disclosed embodiments of the ticketing system, the ticketing processor subsystem may also be configured to create an ordered list of the learned analyst profiles that may be associated with the learned problem profile of analysts that are available to resolve the problem, that may be based on a rank ordering algorithm and performance metrics that may be associated with each analyst and each learned problem of the learned problems of the learned problem profile. The ticketing processor subsystem may further be configured to create the list of the pre-determined number of the recommended analysts of the learned analyst profiles from the pre-determined number of the learned analyst profiles of the ordered list that may have the highest rank order values. The ordered list of the learned analyst profiles may be ordered from a learned analyst profile having a highest rank order value to a learned analyst profile having a lowest rank order value, the rank ordering algorithm may be implemented by a rank ordering module, and the ticketing processor subsystem may further include the rank ordering module.

In any of the disclosed embodiments of the ticketing system, a client processor subsystem of the client information handling system may also be configured to receive the SLA proposal that may be associated with the problem ticket from the ticketing information handling system. The client processor subsystem may further be configured to provide the SLA proposal to a user interface. The client processor subsystem may also be configured to receive a SLA response to the SLA proposal from the user interface. The client processor subsystem may further be configured to send the SLA response that may be associated with the problem ticket to the ticketing information handling system. The SLA response may include an acceptance indicator, an acceptable analyst of the list of the pre-determined number of the recommended analysts, and an acceptable SLA estimation. The client processor subsystem may include the application, and the application may be associated with the user interface.

In any of the disclosed embodiments of the ticketing system, the ticketing processor subsystem may also be configured to receive the SLA response that may be associated with the problem ticket from the client information handling system. The ticketing processor subsystem may also be configured to, in response to the acceptance indicator indicating that the SLA proposal is accepted, add the acceptable SLA estimation of the SLA response to the problem ticket and assign the problem ticket to the acceptable analyst of the SLA response.

In any of the disclosed embodiments of the ticketing system, the problem information may include one or more of an error message, an error code, an exception code, a screenshot of information that may be displayed by a user interface on a display of the client information handling system, a page name and a page header of the information that may be displayed by the user interface on the display, a transaction name, a product name, a business process name, a business domain name, a problem severity, a submission time, a selected problem priority, an accepted problem priority, an adjusted SLA, and an accepted SLA.

In any of the disclosed embodiments of the ticketing system, the performance metrics may include one or more of a customer satisfaction score, a service level agreement metric, and a reoccurrence metric.

In any of the disclosed embodiments of the ticketing system, the analyst information may include one or more of a business domain, shift information, a time zone, a holiday zone, a start date, a current work load, and a next available time.

In any of the disclosed embodiments of the ticketing system, the product information may include one or more of: a business domain, a current status, a product available time, and a list of systems, each of the systems may include learned problem profile resolution capabilities, a system status, and system availability information.

In any of the disclosed embodiments of the ticketing system, the user information may include one or more of a business domain, shift information, a time zone, a holiday zone, contact information, analyst preferences, a next available time, and a SLA associated with a user.

In another aspect, a disclosed method may include, receiving, by a ticketing information handling system of a ticketing system, a problem ticket including a problem and problem information that may be associated with the problem from a client information handling system of the ticketing system. The ticketing information handling system may be coupled to the client information handling system, the ticketing information handling system may be further coupled to a learned problem profile database and a learned analyst profile database of the ticketing system. The method may also include identifying, by a ticketing processor subsystem of the ticketing information handling system, a learned problem profile, that may be based on the problem information of the problem ticket and a categorization algorithm. The method may further include identifying, by the ticketing processor subsystem, learned analyst profiles of the learned analyst profile database that may be associated with the learned problem profile. The method may also include determining, by the ticketing processor subsystem, a SLA estimation, that may be based on the learned problem profile, the learned analyst profiles that may be associated with the learned problem profile, and a SLA estimation algorithm. The method may further include determining, by the ticketing processor subsystem, a list of a pre-determined number of recommended analysts of the learned analyst profiles. The method may also include sending, by the ticketing processor subsystem, a SLA proposal that may be associated with the problem ticket to the client information handling system. The SLA proposal may include the SLA estimation and the list of the pre-determined number of recommended analysts, the categorization algorithm that may be implemented by a categorization module, the SLA estimation algorithm that may be implemented by a SLA estimation module, the ticketing processor subsystem may include the categorization module and the SLA estimation module, and the ticketing system may include the learned problem profile database and the learned analyst profile database.

In any of the disclosed embodiments of the method, the SLA estimation may be further based on an average resolution time of the problem, a product available time of product information of a product information database, an available time of each analyst of the learned analyst profiles, a resolution time of each analyst available to resolve the problem, user information that may be associated with a user and the problem ticket, and analyst information that may be associated with each analyst. The ticketing system may also include the product information database.

In any of the disclosed embodiments of the method, the method may also include retrieving the learned analyst profiles from a correlation database entry of a correlation database that may be associated with the learned problem profile, prior to the identification of the learned analyst profiles. The ticketing system may include the correlation database.

In any of the disclosed embodiments of the method, the method may also include creating an ordered list of the learned analyst profiles that may be associated with the learned problem profile of analysts that are available to resolve the problem, that may be based on a rank ordering algorithm and performance metrics that may be associated with each analyst and each learned problem of the learned problems of the learned problem profile. The method may further include creating the list of the pre-determined number of the recommended analysts of the learned analyst profiles from the pre-determined number of the learned analyst profiles of the ordered list that may have the highest rank order values. The ordered list of the learned analyst profiles may be ordered from a learned analyst profile having a highest rank order value to a learned analyst profile having a lowest rank order value, the rank ordering algorithm may be implemented by a rank ordering module, and the ticketing processor subsystem may further include the rank ordering module.

In any of the disclosed embodiments of the method, the method may also include receiving, by the client information handling system, the SLA proposal that may be associated with the problem ticket from the ticketing information handling system. The method may further include providing, by a client processor subsystem of the client information handling system, the SLA proposal to a user interface. The method may also include receiving, by the client processor subsystem, a SLA response to the SLA proposal from the user interface. The method may further include sending, by the client processor subsystem, the SLA response that may be associated with the problem ticket to the ticketing information handling system. The SLA response may include an acceptance indicator, an acceptable analyst of the list of the pre-determined number of the recommended analysts, and an acceptable SLA estimation, the application may be associated with the user interface, and the client processor subsystem may include the application.

In any of the disclosed embodiments of the method, the method may also include receiving the SLA response that may be associated with the problem ticket from the client information handling system. The method may further include, in response to the acceptance indicator indicating that the SLA proposal is accepted, adding the acceptable SLA estimation of the SLA response to the problem ticket and assigning the problem ticket to the acceptable analyst of the SLA response.

In any of the disclosed embodiments of the method, the problem information may include one or more of an error message, an error code, an exception code, a screenshot of information that may be displayed by a user interface on a display of the client information handling system, a page name and a page header of the information that may be displayed by the user interface on the display, a transaction name, a product name, a business process name, a business domain name, a problem severity, a submission time, a selected problem priority, an accepted problem priority, an adjusted SLA, and an accepted SLA.

In any of the disclosed embodiments of the method, the performance metrics may include one or more of a customer satisfaction score, a service level agreement metric, and a reoccurrence metric.

In any of the disclosed embodiments of the method, the analyst information may include one or more of a business domain, shift information, a time zone, a holiday zone, a start date, a current work load, and a next available time.

In any of the disclosed embodiments of the method, the product information may include one or more of: a business domain, a current status, a product available time, and a list of systems, each of the systems may include learned problem profile resolution capabilities, a system status, and system availability information.

In any of the disclosed embodiments of the method, the user information may include one or more of a business domain, shift information, a time zone, a holiday zone, contact information, analyst preferences, a next available time, and a SLA associated with a user.

BRIEF DESCRIPTION OF THE DRAWINGS

For a more complete understanding of the present invention and its features and advantages, reference is now made to the following description, taken in conjunction with the accompanying drawings, in which:

FIG. 7 is a flow chart of selected elements of a method for building learned problem profiles;

FIG. 8 is a flow chart of selected elements of a method for building learned analyst profiles;

FIG. 10 is a flow chart of selected elements of a method for creating an ordered list of learned analyst profiles;

DESCRIPTION OF PARTICULAR EMBODIMENT(S)

Figure 1:
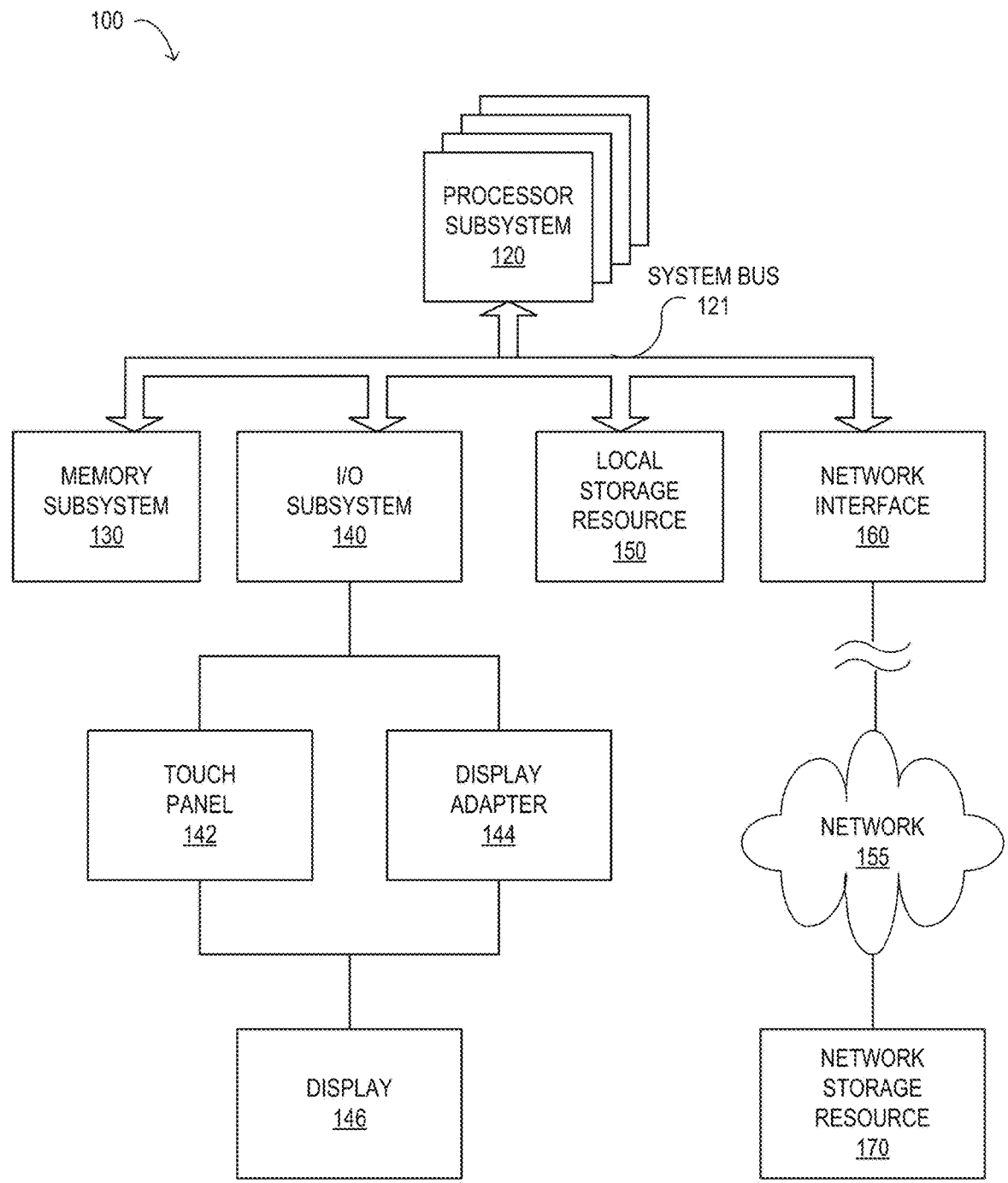
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 4, 5, 6, 7, 8, 9, 10, and 11 wherein like numbers are used to indicate like and corresponding parts.

Turning now to the drawings, FIG. 1 illustrates a block diagram depicting selected elements of an embodiment of information handling system 100. As shown in FIG. 1, components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to a network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display 146 that is driven by display adapter 144. A ticketing network system may include a client information handling system 100-1 and a ticketing information handling system 100-2 and a network 155 coupled to both client information handling system 100-1 and ticketing information handling system 100-2, described in further detail below.

Figure 2A:
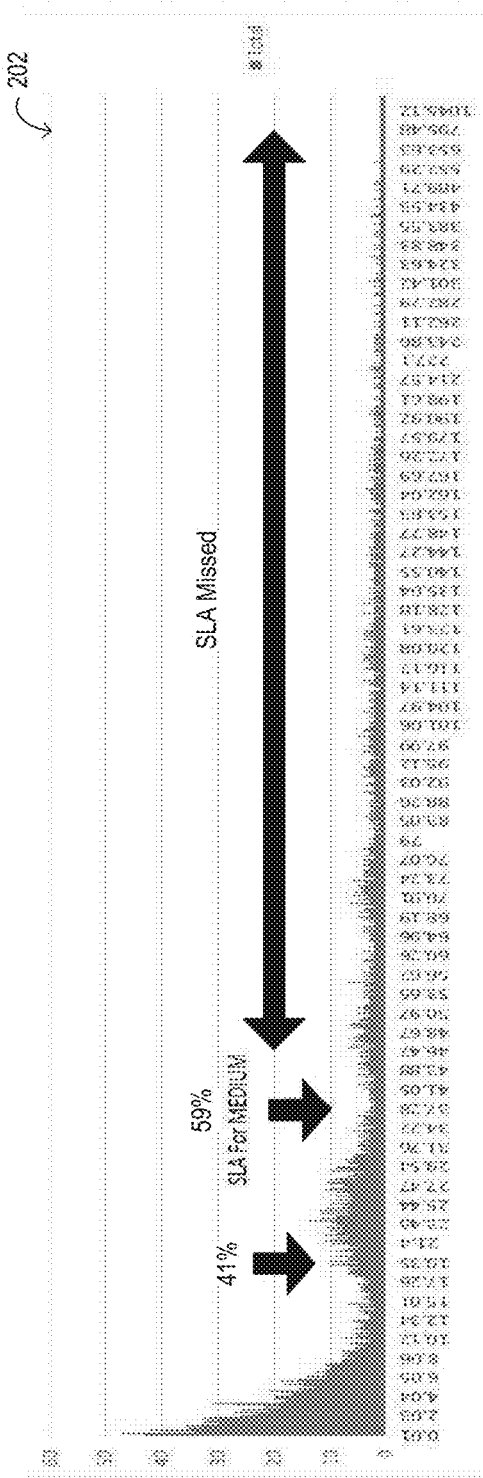
FIGS. 2A & 2B depict service level agreement closure time trends of problem tickets.
Figure 2B:
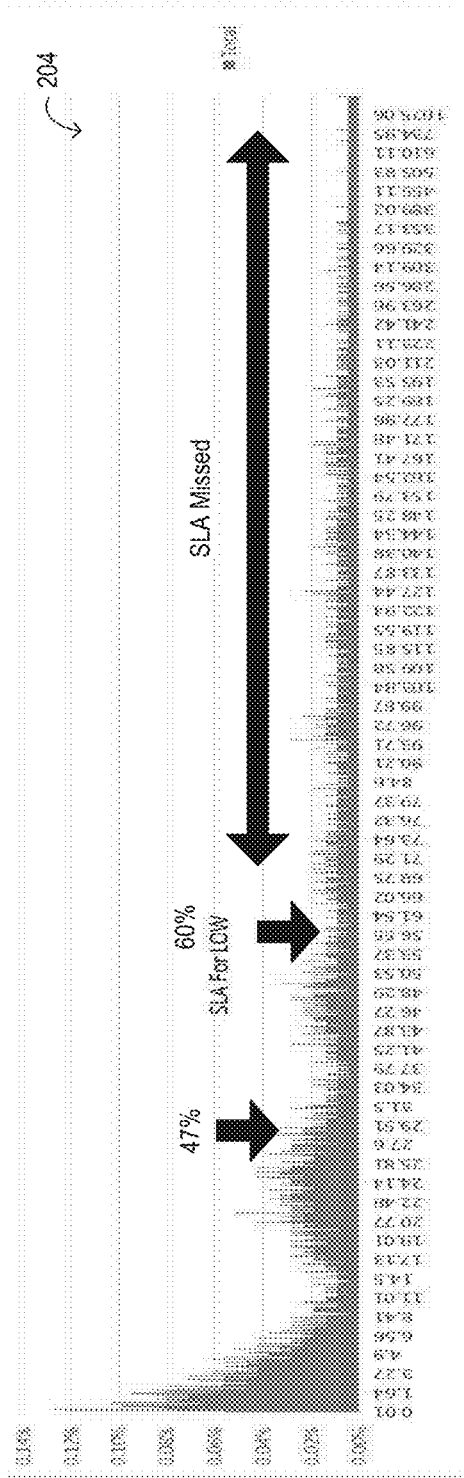

As will be described in further detail herein, in operation, a client information handling system may be utilized to execute a user application, such as information handling system 100-1. A problem may occur during execution of the user application and a user may request help from customer support to resolve the problem. Typically, the user submits the problem to customer support using a ticket submission system, which may be a third party ticket submission system. The ticket submission system may require the user to provide a description of the problem, the name of the user application, the priority of the problem, the severity of the problem, among other information associated with the problem. The ticket submission system may send the problem ticket including the problem and the information associated with the problem to an information handling system, such as information handling system 100. Information handling system 100 may assign the problem ticket to the first analyst of a customer support team that becomes available to work on the problem ticket using a round-robin ticket assignment method. The user has an expectation that the problem will be resolved in an amount of time established in a service level agreement between the user and customer support, and customer support works to resolve the problem within this amount of time. The amount of time to resolve a given problem of a problem ticket depends on the analyst assigned and their level of expertise to resolve the given problem. If the first analyst is unable to resolve the problem due to a low level of expertise, information handling system 100 may need to re-assign the problem to another analyst that becomes available to work on the problem ticket using the same round-robin ticket assignment method. The knowledge level varies from analyst to analyst and each analyst's level of expertise varies from problem to problem. As such, the amount of time to successfully resolve a particular problem may vary from an acceptable amount of time to an unacceptable amount of time based on the analyst assigned to the problem leading to customer support missing service level agreement closure times, as depicted in FIGS. 2A & 2B. FIG. 2A depicts typical service level agreement closure time trends of customer support for medium priority problem tickets that exceed, meet, or miss service level closure time agreements. For example, 41% of the medium priority tickets are resolved and closed within half the closure time agreement, where medium priority tickets are to be resolved in 36 hours or less. Another 41% exceeded or significantly exceeded these closure time agreements. FIG. 2B shows a similar trend for low priority tickets where 47% are resolved and closed within half the closure time and 40% exceeded or significantly exceeded these closure time agreements. These trends may be due to ineffective prioritization of the problem tickets and using the round-robin ticket assignment method to assign problem tickets to analysts. This may lead to missed service level agreements and may impact the analysts' effectiveness and efficiency, and the user's satisfaction.

Therefore, a ticketing system that may enable smart prioritization and assignment of problem tickets to analysts of customer support by using machine analysis and learning from both historical and real-time operational data to perform real-time problem categorization and problem complexity estimation to build problem and analyst profiles, may allow analysts that are subject matter experts to be linked to problem profiles with every incoming problem ticket and the incoming problem tickets to be intelligently assigned to the analysts having the expertise to resolve those problem tickets. The ticketing system may continue to learn and improve the building of the problem profiles and the analyst profiles and improve the problem to analyst correlation, which may result in improvement in closure time service level agreements and improved analyst effectiveness and efficiency and user satisfaction, as described in further detail herein.

Figure 3:
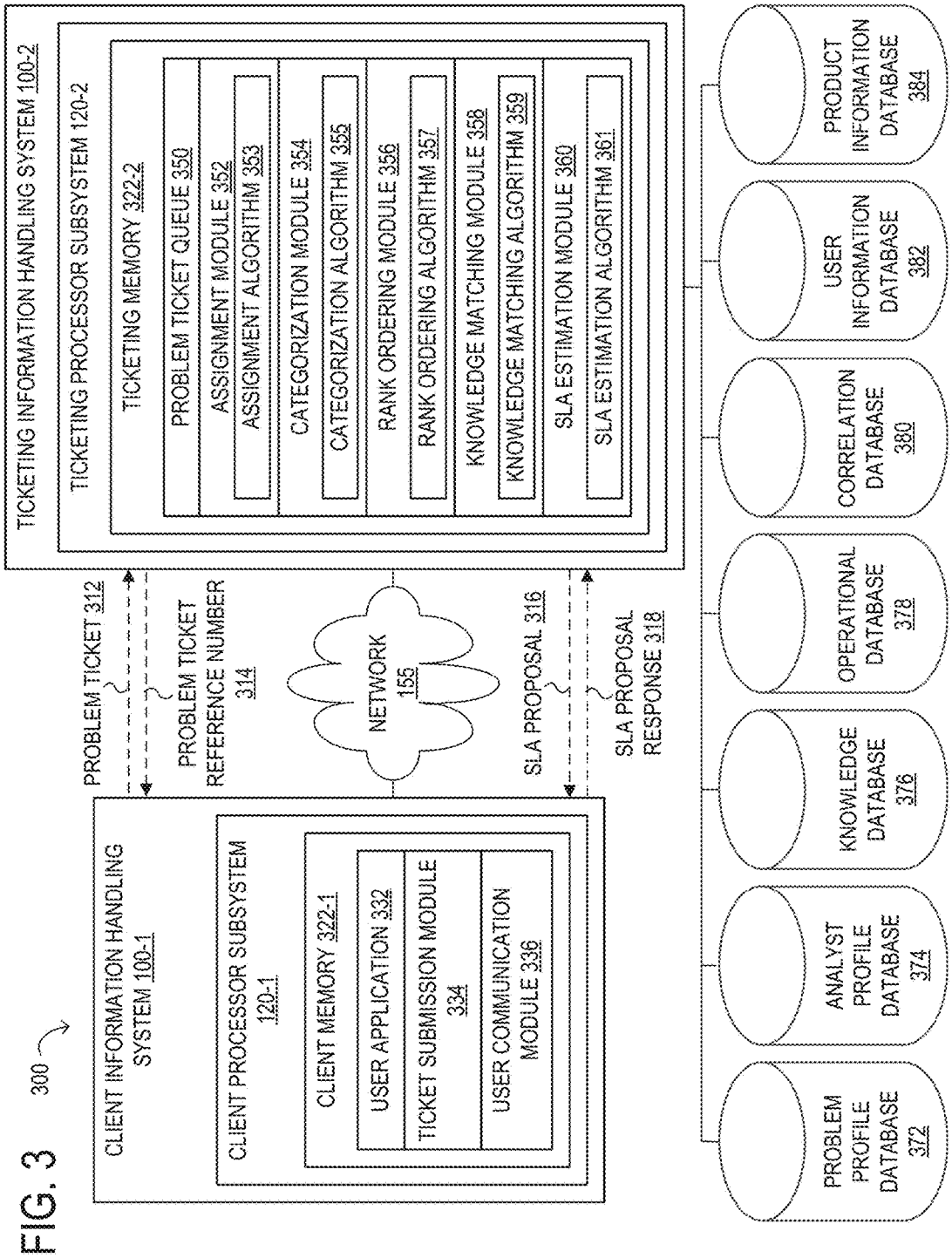
FIG. 3 is a block diagram of selected elements of an embodiment of a ticketing system.

Turning now to FIG. 3, a block diagram of selected elements of an embodiment of a ticketing system 300 is illustrated. In FIG. 3, ticketing system 300 is shown in a schematic representation and is not drawn to scale or perspective. It is noted that, in different embodiments, ticketing system 300 may be operated with additional or fewer elements.

As shown in FIG. 3, components of ticketing system 300 may include, but are not limited to, a client information handling system 100-1 and a ticketing information handling system 100-1 that may be coupled to client information handling system 100-1. In one or more embodiments, client information handling system 100-1 may host a web server that may allow a user to interact with web pages via a browser interface that are controlled and managed by the web server. Ticketing system 300 may also include network 155 that may be coupled to client information handling system 100-1 and ticketing information handling system 100-1.

Client information handling system 100-1 may include a client processor subsystem 120-1 that may have a client processor and a client memory 322-1, as described above with respect to processor subsystem 120. During operation, client processor subsystem 120-1 may execute a user application 332 that may have a user interface, which may be stored at client memory 322-1, and may detect an occurrence of a problem during execution of user application 332 by client processor subsystem 120-1. User application 332 may be a business application or other types of applications. The user interface of user application 332 may be an application browser interface or other types of application interfaces. The problem may be an error, an exception, and other types of problems that may occur during execution of an application. The problem may be presented to a user of user application 332 using the user interface of user application 332. The user may request help to resolve the problem by clicking a submit ticket button that may be installed as a plugin to the user interface to provide the user request to the user interface.

Client processor subsystem 120-1 may, in response to one or more of the occurrence of the problem and the user request from the user interface execute a ticket submission module 334, which may be stored at client memory 322-1, to collect problem information that may be associated with the occurrence of the problem. The problem information may include one or more of a problem description of the problem that may be in text form, an error message, an error code, an exception code, a screenshot of information that may be displayed by the user interface on display 146 of client information handling system 100-1, a name and a header of a web page that may be displayed by the user interface on display 146, a transaction name, a product name that may be associated with user application 332, a business process name that may be associated with user application 332, a business domain name that may be associated with user application 332, a problem severity, a submission time, and a selected problem priority. The problem information may also include an accepted problem priority, an adjusted service level agreement (SLA), an accepted SLA, a problem resolution time, and an analyst email associated with the problem, which may be added during further processing of the problem. Client processor subsystem 120-1 may create a problem ticket 312 that may include the problem and the problem information. Problem ticket 312 may also include user information associated with the user. The user information may include one or more of a business domain, shift information, a time zone, a holiday zone, contact information, analyst preferences, a next available time, and a SLA associated with the user. Client processor subsystem 120-1 may send problem ticket 312 to ticketing information handling system 100-2. Client processor subsystem 120-1 may, in response to reception of a problem ticket reference number 314 that may be associated with problem ticket 312 from ticketing information handling system 100-2, provide problem ticket reference number 314 to the user interface for user notification. Problem ticket reference number 314 may be provided and presented to the user of user application 332 using the user interface of user application 332.

Ticketing information handling system 100-2 may be coupled to a learned problem profile database 372, a learned analyst profile database 374, a knowledge database 376, an operational database 378, a correlation database 380, a user information database 382, and a product information database 384. Network storage resource 170, memory subsystem 130-2 of ticketing information handling system 100-2, and local storage resource 150-2 of ticketing information handling system 100-2 may include one or more of learned problem profile database 372, learned analyst profile database 374, knowledge database 376, operational database 378, correlation database 380, user information database 382, and product information database 384. Ticketing information handling system 100-2 may include a ticketing processor subsystem 120-2, which may have a ticketing processor and a ticketing memory 322-2, as previously described with respect to processor subsystem 120. Ticketing memory 322-2 may store a problem ticket queue 350, an assignment module 352 to implement an assignment algorithm 353, a categorization module 354 to implement a categorization algorithm 355, a rank ordering module 356 to implement a rank ordering algorithm 357, a knowledge matching module 358 to implement a knowledge matching algorithm 359, and a SLA estimation module 360 to implement a SLA estimation algorithm 361.

During operation, ticketing processor subsystem 120-2 may receive problem ticket 312 that may include the problem and the problem information from client information handling system 100-1. Ticketing processor subsystem 120-2 may create problem ticket reference number 314 associated with problem ticket 312. Ticketing processor subsystem 120-2 may add problem ticket reference number 314 to problem ticket 312 to allow the components of ticketing system 300 to associate problem ticket 312 with problem ticket reference number 314. Ticketing processor subsystem 120-2 may send problem ticket reference number 314 associated with problem ticket 312 to client information handling system 100-1. Alternatively, ticketing processor subsystem 120-2 may send problem ticket 312 including associated problem ticket reference number 314 to client information handling system 100-1.

Ticketing processor subsystem 120-2 may create a first problem profile pattern for the problem of problem ticket 312 from the problem information of problem ticket 312 by identifying various keywords in the problem information of problem ticket 312. In one or more embodiments, the various keywords may be in the problem description of problem ticket 312. Ticketing processor subsystem 120-2 may categorize the first problem profile pattern by using categorization algorithm 355 to determine whether the first problem profile pattern has a known learned problem profile pattern that may be associated with a respective known learned problem profile of known learned problem profiles of learned problem profile database 372. Building the learned problem profiles of learned problem profile database 372 is described in further detail below. Categorization algorithm 355 may be an anytime optimal search-based algorithm that finds high-quality problem profile pattern matches and continuously learns and improves the relations between the first problem profile pattern, e.g. these various keywords in the problem information of problem ticket 312, and the known problem profile patterns of the known learned problem profiles, e.g. various keywords in the knowledge articles of knowledge database 376 associated with the known problem profile patterns of the known learned problem profiles. In one or more embodiments, categorization algorithm may assign a weighting value to each of the various keywords and utilize those weighting values when finding matches. Categorization algorithm 355 may calculate each best match value for a best match of the first problem profile pattern of problem ticket 312 to each of the known learned problem profile patterns of the respective known learned problem profiles. Categorization algorithm 355 may determine the highest calculated best match value for the best match of the first problem profile pattern to the known learned problem profile pattern of the respective known learned problem profile. Categorization algorithm 355 may compare the highest calculated best match value to a best match threshold value. When the highest calculated best fit value is greater than or equal to the best match threshold value, ticketing processor subsystem 120-2 may add problem ticket 312 to the known learned problem profile associated with the highest calculated best match value. When the highest calculated best match value is less than the best match threshold value, ticketing processor subsystem 120-2 may add a new learned problem profile that may have problem ticket 312, problem information 314, and the first problem profile pattern to learned problem profile database 372. Ticketing processor subsystem 120-2 may identify a learned problem profile of learned problem profile database 372 that may be associated with the problem of problem ticket 312 based on the categorization results of the problem by categorization algorithm 355. When the highest calculated best match value is greater than or equal to the best match threshold value, the learned problem profile may be the known learned problem profile associated with the highest calculated best match value. When the calculated best match value is less than the best match threshold value, the learned problem profile may be the new learned problem profile.

In one or more embodiments, ticketing processor subsystem 120-2 may build and maintain problem profile database 372 by creating and adding learned problem profiles to problem profile database 372. Ticketing processor subsystem 120-2 may, for each of one or more completed problem tickets in operational database 378 retrieve a completed problem ticket, a completed problem associated with the completed problem ticket, and completed problem information associated with the completed problem from the operational database. Ticketing processor subsystem 120-2 may create a completed problem profile pattern for the completed problem from the completed problem information associated with the completed problem, categorize the completed problem profile pattern to create a completed problem profile associated with the completed problem and the completed problem information, and add the completed problem profile to problem profile database 372, as previously described.

Ticketing processor subsystem 120-2 may search knowledge database 376 by using knowledge matching algorithm 359 to identify one or more matching knowledge articles for resolution of the problem associated with problem ticket 312 that may be based on problem ticket 312, the problem associated with problem ticket 312, and the problem information associated with the problem. Knowledge database (KDB) 376 may include knowledge database entries, each knowledge database entry may include a KDB problem ticket, a KDB problem associated with the KDB problem ticket, KDB problem information associated with the KDB problem, system information associated with the KDB problem, and one or more knowledge articles for resolution of the KDB problem. Knowledge matching algorithm 359 may be an anytime optimal search-based algorithm, similar to categorization algorithm 355 as previously described, that finds high-quality problem profile pattern matches of the problem and associated information of problem ticket 312 with the knowledge articles of knowledge database 376 associated with the known problem profile patterns of the known learned problem profiles.

Knowledge matching algorithm 359 may calculate each best match value for a best match of problem ticket 312 and the problem and associated problem information associated with problem ticket 312 to each of the KDB problem tickets and the KDB problems and associated KDB problem information associated with each of the KDB problem tickets of respective existing knowledge database entries of knowledge database 376. For each calculated best match value calculated for problem ticket 312 and the problem and associated problem information associated with problem ticket 312 and each KDB problem ticket and the KDB problem and the associated KDB problem information of the respective existing knowledge database entry of knowledge database 376, compare the calculated best match value to a best match threshold value. When the calculated best match value is greater than or equal to the best match threshold value, ticketing processor subsystem 120-2 may add a matching knowledge article and associated resolution instructions, which may be a best match of problem ticket 312 and the problem and associated problem information associated with problem ticket 312 with the KDB problem ticket and the KDB problem and the associated KDB problem information, to one or more of the learned problem profile associated with problem ticket 312 and problem ticket 312.

In one or more embodiments, ticketing processor subsystem 120-2 may also add one or more of a knowledge article identification associated with the matching knowledge article, a cross-reference for the matching knowledge article, the KDB problem associated with the KDB problem ticket, the KDB problem information associated with the KDB problem, system information associated with the KDB problem, a KDB problem complexity estimate, e.g. amount of effort required to resolve the KDB problem, a KDB time estimate to resolve the problem to one or more of the learned problem profiles associated with problem ticket 312 and problem ticket 312. The matching knowledge article includes instructions and information to enable an analyst to resolve the associated problem. By adding the matching knowledge articles to problem ticket 312, all of the information is already available when an analyst starts working on problem ticket 312 in order to resolve the problem more efficiently.

In one or more embodiments, ticketing processor subsystem 120-2 may create a first set of problem categories for the problems in learned problem profile database 372 based on the most repeated keywords in the problem description for each of the product names of the learned problem profile of learned problem profile database 372. Next, the knowledge articles used to resolve the problems in learned problem profile database 372 is mapped to the first set of problem categories. The most used knowledge articles applied to resolving the problems in the particular problem categories are then grouped into a second set of problem categories. Ticketing processor subsystem 120-2 may continuously sort the sets of problem categories based on problem descriptions and associated knowledge articles of learned problem profile database 372 and rearrange the problem groupings and problem categories based on the learning. In one or more embodiments, ticketing processor subsystem 120-2 may combine problem categories to create new problem categories, where a new problem category may have a broader spread of keywords and knowledge articles. For example, some knowledge articles may be related to more than one category of learned problem profiles.

Ticketing processor subsystem 120-2 may build, maintain, and update learned analyst profile database 374 by creating and adding learned analyst profiles to learned analyst profile database 374. In one or more embodiments, a configuration process, an initialization process, an update process, and other types of processes may create learned analyst profiles from a list of known analysts and associated analyst information, and add these learned analyst profiles to learned analyst profile database 374. The analyst information may include one or more of a business domain, shift information, a time zone, a holiday zone, a start date, and a next available time. The analyst information may also include a current work load associated with an analyst, which may be added to the associated learned analyst profile of learned analyst profile database 374 during further processing of the learned analyst profile.

Ticketing processor subsystem 120-2 may, for each of one or more completed problem tickets in operational database 378 retrieve an assigned analyst associated with a completed problem ticket, analyst information that may be associated with the assigned analyst and performance metrics that may be associated with the assigned analyst and the completed problem ticket from operational database 378. The performance metrics may include one or more of a customer satisfaction score, a service level agreement metric, a reoccurrence metric, problem acknowledgment time, and problem resolution time. Ticketing processor subsystem 120-2 may, for each of one or more completed problem tickets in operational database 378 retrieve a known learned problem profile that may be associated with the completed problem ticket from learned problem profile database 372. Ticketing processor subsystem 120-2 may, for each of one or more completed problem tickets in operational database 378, add the analyst information, a cross-reference to the known learned problem profile, and the performance metrics to a learned analyst profile in learned analyst profile database 374 that may be associated with the assigned analyst.

In one or more embodiments, ticketing processor subsystem 120-2 may, for each of one or more completed problem tickets in operational database 378, also add a cross-reference of the learned analyst profile associated with the completed problem ticket, a cross-reference of the rank ordered learned analyst profiles associated with the known learned problem profile, and a cross reference of the known learned problem profile to a correlation database entry of correlation database 380. Building and maintaining correlation database 380 in this manner allows for the efficient identification of analysts that are effective at resolving problems associated with the known learned problem profile, for example, identifying the analyst with the highest customer satisfaction score for resolving these types of problems.

Ticketing processor subsystem 120-2 may, for each of one or more completed problem tickets in operational database 378, order the learned analyst profiles that may be associated with the known learned problem profile associated with the completed problem ticket by using rank ordering algorithm 357 that may be based on the performance metrics of one of the learned analyst profiles associated with the known learned problem profile, and the performance metrics of each of the other learned analyst profiles associated with the known learned problem profile. Rank ordering algorithm 357 may order the learned analyst profiles from a learned analyst profile having a highest rank order value to a learned analyst profile having a lowest rank order value to create the rank ordered learned analyst profiles by comparing each rank order value of each of the learned analyst profiles to each rank order value of each of the other learned analyst profiles. When the rank order value of one of the learned analyst profiles is greater than the rank order values of each of the other learned analyst profiles, the rank order value of the one of the learned analyst profiles is the highest rank order value. The rank order value may be a value associated with the performance metrics associated with an analyst associated with the learned analyst profile and the learned problem profile, where high rank order values correlate to high performance metric values. For example, the rank order value may be associated with the analyst and the learned problem profile and may be a value associated with a customer satisfaction score, a problem ticket closure rate, a SLA metric (e.g. meeting the SLA, exceeding the SLA, or missing the SLA), a reoccurrence metric (e.g. how many times it takes for an analyst to resolve a problem associated with the known learned problem profile), a problem acknowledgment time, a problem resolution time, or a value associated with a combination of one or more of these values.

Ticketing processor subsystem 120-2 may create a list of a pre-determined number of recommended analysts of the rank ordered learned analyst profiles that may be associated with the learned problem profile that are available to resolve the problem of problem ticket 312, based on the analyst information of each learned analyst profile of the rank ordered learned analyst profiles and the rank order value of each learned analyst profile. Ticketing processor subsystem 120-2 may determine whether an analyst of each learned analyst profile of the rank ordered learned analyst profiles is available to resolve the problem of problem ticket 312 based on one or more of the next available time the analyst is available to work on a problem ticket, the current work load of the analyst, among other analyst information. Ticketing processor subsystem 120-2 may create the list of the pre-determined number of recommended analysts of the rank ordered learned analyst profiles from the pre-determined number of the learned analyst profiles of the rank ordered learned analyst profiles that has the highest rank order values compared to the other rank ordered learned analyst profiles and the analyst has been determined to be available to resolve the problem. For example, ticketing processor subsystem 120-2 may create a list of the top three recommended analysts of the rank ordered learned analyst profiles associated with the learned problem profile that are the highest ranked and are available to resolve the problem of problem ticket 312. The pre-determined number may be set during a configuration cycle, an initialization cycle, an update cycle, a user recommended number, among other ways to set the number.

Ticketing processor subsystem 120-2 may determine a SLA estimation using SLA estimation algorithm 361 based on the learned problem profile associated with problem ticket 312, the list of the pre-determined number of recommended analysts of the rank ordered learned analyst profiles that are available to resolve the problem of problem ticket 312. The SLA estimation may be further based on an average resolution time of the problem of problem ticket 312, a system availability of product information database 384 associated with the problem of problem ticket 312, a next available time of each analyst of the learned analyst profiles, a resolution time of each analyst available to resolve the problem, user information that may be associated with a user and problem ticket 312, and analyst information associated with each analyst. Ticketing processor subsystem 120-2 may determine the average resolution time of the problem of problem ticket 312 by retrieving the KDB time estimates to resolve the problems associated with the learned problem profile and calculating the average resolution time of the problem. In one or more embodiments, ticketing processor subsystem 120-2 may determine the average resolution time of the problem by retrieving the problem resolution time of the performance metrics associated with the learned problem profile and each of the analysts associated with the problems of the learned problem profile, and calculating the average resolution time of the problem. Ticketing processor subsystem 120-2 may retrieve the system availability information from product information database 384 by using system information from knowledge database 376 and learned problem profile database 372 associated with the learned problem profile and the problem of problem ticket 312. Ticketing processor subsystem 120-2 may retrieve the next available time, the resolution time of each analyst available to resolve the problem, and analyst information of each analyst from the learned analyst profiles associated with the list of the pre-determined number of recommended analysts of the rank ordered learned analyst profiles. Ticketing processor subsystem 120-2 may retrieve the user information that may be associated with the user and problem ticket 312 from user information database 382. Ticketing processor subsystem 120-2 may calculate the SLA estimation by adding the average resolution time, the system time to available, the resource time to available, and the dependency time to available, where the system time to available may be based on the system information, the resource time to available may be based on the next available times of the analysts, the dependency time to available may be based on the next available time of the user.

Ticketing processor subsystem 120-2 may create a SLA proposal 316 that includes the SLA estimation and the list of the pre-determined number of recommended analysts of the rank ordered learned analyst profiles associated with problem ticket 312. Ticketing processor subsystem 120-2 may send SLA proposal 316 associated with problem ticket 312 to client information handling system 100-1.

Client processor subsystem 120-1 may, in response to reception of SLA proposal 316 associated with problem ticket 312 from ticketing information handling system 100-2, provide SLA proposal 316 to the user interface for user negotiation. SLA proposal 316 may be provided and presented to the user of user application 332 using the user interface of user application 332. Client processor subsystem 120-1 may receive SLA response 318 to SLA proposal 316 from the user interface. Client processor subsystem 120-1 may send SLA response 318 that may be associated with problem ticket 312 to ticketing information handling system 100-2. SLA response 318 may include an acceptance indicator that indicates whether the user has accepted SLA proposal 316, an acceptable analyst selected from the list of the pre-determined number of recommended analysts of the rank ordered learned analyst profiles of SLA proposal 316, and an acceptable SLA estimation based on the SLA estimation of SLA proposal 316.

Ticketing processor subsystem 120-2 may receive SLA response 318 from client information handling system 100-1. Ticketing processor subsystem 120-2 may, in response to the acceptance indicator indicating that SLA proposal 316 is accepted, add the acceptable SLA estimation of SLA response 318 to problem ticket 312 and assign problem ticket 312 to the acceptable analyst of SLA response 318.

Processing problem tickets in this manner provides more realistic SLA estimation to each particular problem, an SLA proposal acceptance and negotiation method to provide improved user satisfaction, intelligent problem ticket assignment based on anytime optimal search-based learning algorithms and assignment of problem tickets to subject matter experts for efficiency, among other benefits described herein.

Figure 4:
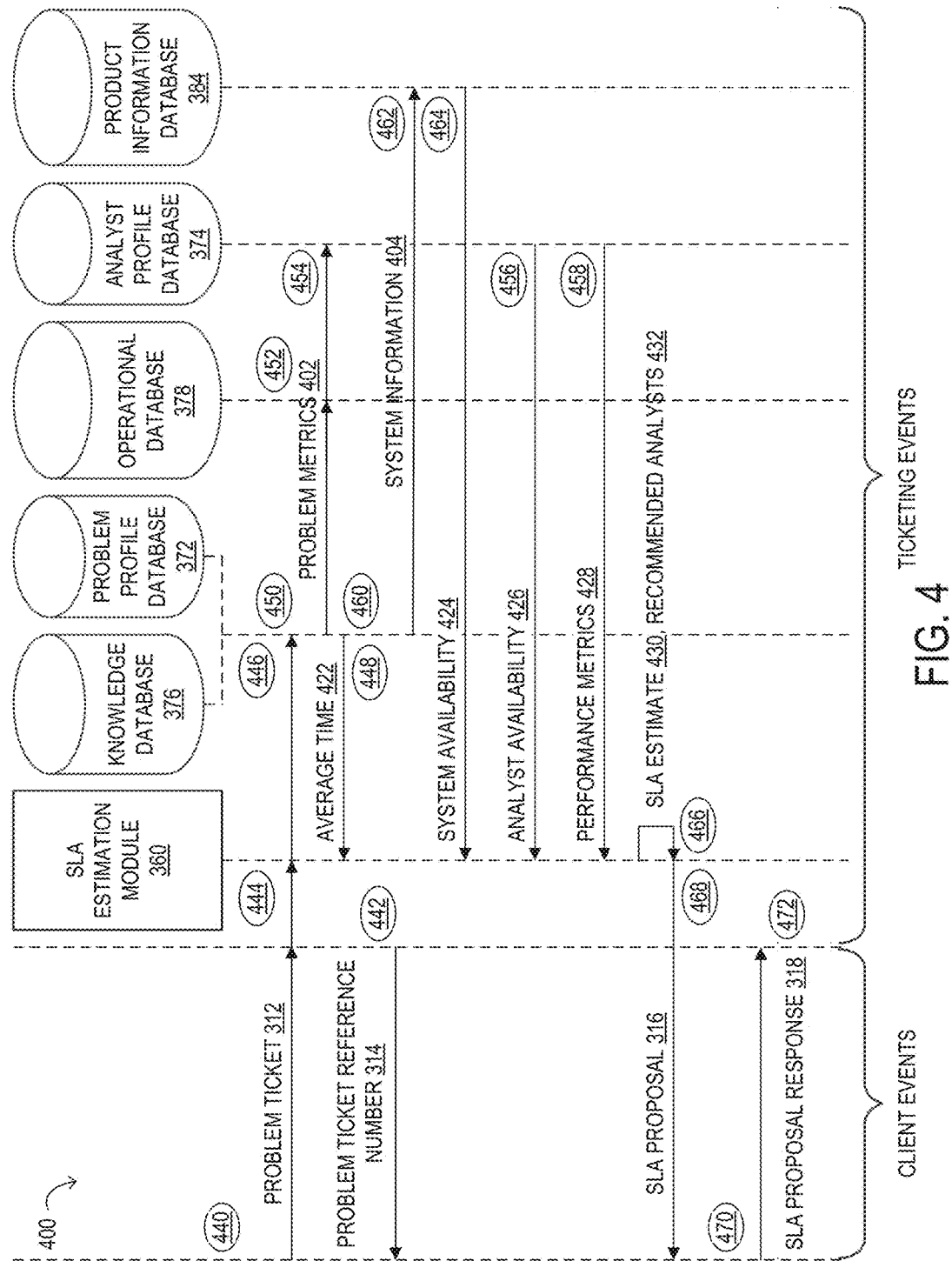
FIG. 4 is an event diagram for selected elements of an embodiment of a ticketing system.

Turning now to FIG. 4, an event diagram 400 of selected events for machine suggested dynamic real time SLAs in operations, as described herein, is depicted in event diagram form. Event diagram 400 may be for events of client information handling system 100-1 and ticketing information handling system 100-2 (see FIGS. 1 and 2) and, in particular, for events of client processor subsystem 120-1 and ticketing processor subsystem 120-2. It is noted that certain operations described in event diagram 400 may be optional or may be rearranged in different embodiments.

Event diagram 400 may begin at event 440, by client processor subsystem 120-1 creating and sending problem ticket 312 to ticketing information handling system 100-2. At event 442, ticketing processor subsystem 120-2 receives problem ticket 312 and sends problem ticket reference number 314 to client information handling system 100-1. At event 444, ticketing processor subsystem 120-2 provides problem ticket 312 to SLA estimation module 360. At event 446, ticketing processor subsystem 120-2 may search knowledge database 376 by using knowledge matching algorithm 359 to identify one or more matching knowledge articles for resolution of the problem associated with problem ticket 312 and determine the average resolution time of the problem of problem ticket 312. At event 448, ticketing processor subsystem 120-2 may provide an average resolution time 422 to SLA estimation module 360. At event 450, ticketing processor subsystem 120-2 may categorize the problem of problem ticket 312 by using categorization algorithm 355 to determine whether a first problem profile pattern associated with the problem of problem ticket 312 has a known learned problem profile pattern associated with a respective known learned problem profile of learned problem profile database 372 and identify the known learned problem profile. At event 452, ticketing processor subsystem 120-2 may utilize problem ticket 312 to retrieve problem metrics 402 associated with problem ticket 312 from operational database 378. At event 454, ticketing processor subsystem 120-2 may identify learned analyst profiles of learned analyst profile database 374 that may be associated with the known learned problem profile. At event 456, ticketing processor subsystem 120-2 may provide analyst availability information 426 associated with the learned analyst profiles associated with the known learned problem profile to SLA estimation module 360. At event 458, ticketing processor subsystem 120-2 may provide performance metrics 428 associated with the learned analyst profiles associated with the known learned problem profile to SLA estimation module 360. At event 460, ticketing processor subsystem 120-2 may retrieve system information 404 from learned problem profile database 372 associated with the known learned problem profile. At event 462, ticketing processor subsystem 120-2 may retrieve system availability information 424 from product information database 384 associated with system information 404 associated with the known learned problem profile. At event 464, ticketing processor subsystem 120-2 may provide system availability information 424 to SLA estimation module 360. At event 466, ticketing processor subsystem 120-2 may create a list of a pre-determined number of recommended analysts 432 of the rank ordered learned analyst profiles associated with the known learned problem profile. SLA estimation module 360 may determine SLA estimate 430 using SLA estimation algorithm 361 based on the known learned problem profile and the learned analyst profiles associated with the known learned problem profile. At event 468, ticketing processor subsystem 120-2 may create SLA proposal 316 that includes the SLA estimate 430 and the list of the pre-determined number of recommended analysts 432 and may send SLA proposal 316 associated with problem ticket 312 to client information handling system 100-1. At event 470, client processor subsystem 120-1 may, in response to reception of SLA proposal 316 associated with problem ticket 312, send SLA response 318 to ticketing information handling system 100-2. SLA response 318 may include an acceptance indicator, an acceptable analyst, and an acceptable SLA estimation. At event 472, ticketing processor subsystem 120-2 may, in response to the acceptance indicator indicating that SLA proposal 316 is accepted, add the acceptable SLA estimation of SLA response 318 to problem ticket 312 and assign problem ticket 312 to the acceptable analyst of SLA response 318.

Figure 5:
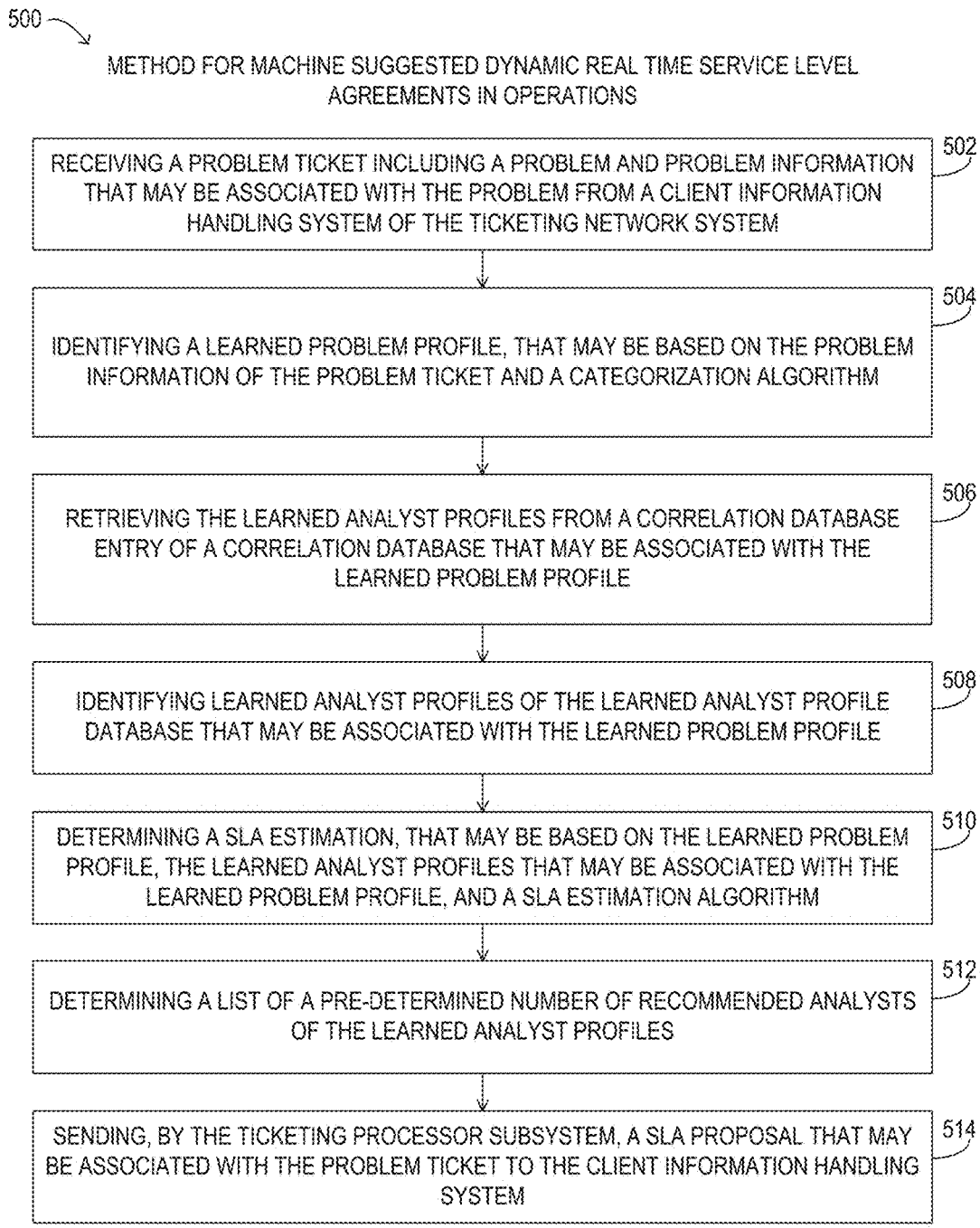
FIG. 5 is a flow chart of selected elements of a method for machine suggested dynamic real time service level agreements in operations.

Referring now to FIG. 5, a flow chart of selected elements of a method 500 for machine suggested dynamic real time service level agreements (SLAs) in operations, as described herein, is depicted in flowchart form. Method 500 may be performed using ticketing information handling system 100-2, in conjunction with a client information handling system 100-1 (see FIGS. 1 and 2) and, in particular, by ticketing processor subsystem 120-2, a categorization module 354 executed by a processor of the ticketing processor subsystem 120-2, and a service level agreement estimation module 360 executed by the processor. It is noted that certain operations described in method 500 may be optional or may be rearranged in different embodiments.

Method 500 may begin at step 502, by a ticketing processor subsystem of a ticketing information handling system receiving a problem ticket that may include a problem and problem information that may be associated with the problem from a client information handling system. The ticketing information handling system may be coupled to the client information handling system, the ticketing information handling system may be further coupled to a learned problem profile database and a learned analyst profile database of the ticketing system. At step 504, the ticketing processor subsystem may identify a learned problem profile that may be based on the problem information of the problem ticket and a categorization algorithm. At step 506, the ticketing processor subsystem may retrieve the learned analyst profiles from a correlation database entry of a correlation database that may be associated with the learned problem profile. The ticketing system may include the correlation database. At step 508, the ticketing processor subsystem may identify learned analyst profiles of the learned analyst profile database that may be associated with the learned problem profile. At step 510, the ticketing processor subsystem may determine a SLA estimation that may be based on the learned problem profile, the learned analyst profiles that may be associated with the learned problem profile, and a SLA estimation algorithm. At step 512, the ticketing processor subsystem may determine a list of a pre-determined number of recommended analysts of the learned analyst profiles. At step 514, the ticketing processor subsystem may send a SLA proposal that may be associated with the problem ticket to the client information handling system. The SLA proposal may include the SLA estimation and the list of the pre-determined number of recommended analysts, the categorization algorithm that may be implement by a categorization module, the SLA estimation algorithm that may be implement by a SLA estimation module, the ticketing processor subsystem may include the categorization module and the SLA estimation module, and the ticketing system may include the learned problem profile database and the learned analyst profile database.

Figure 6:
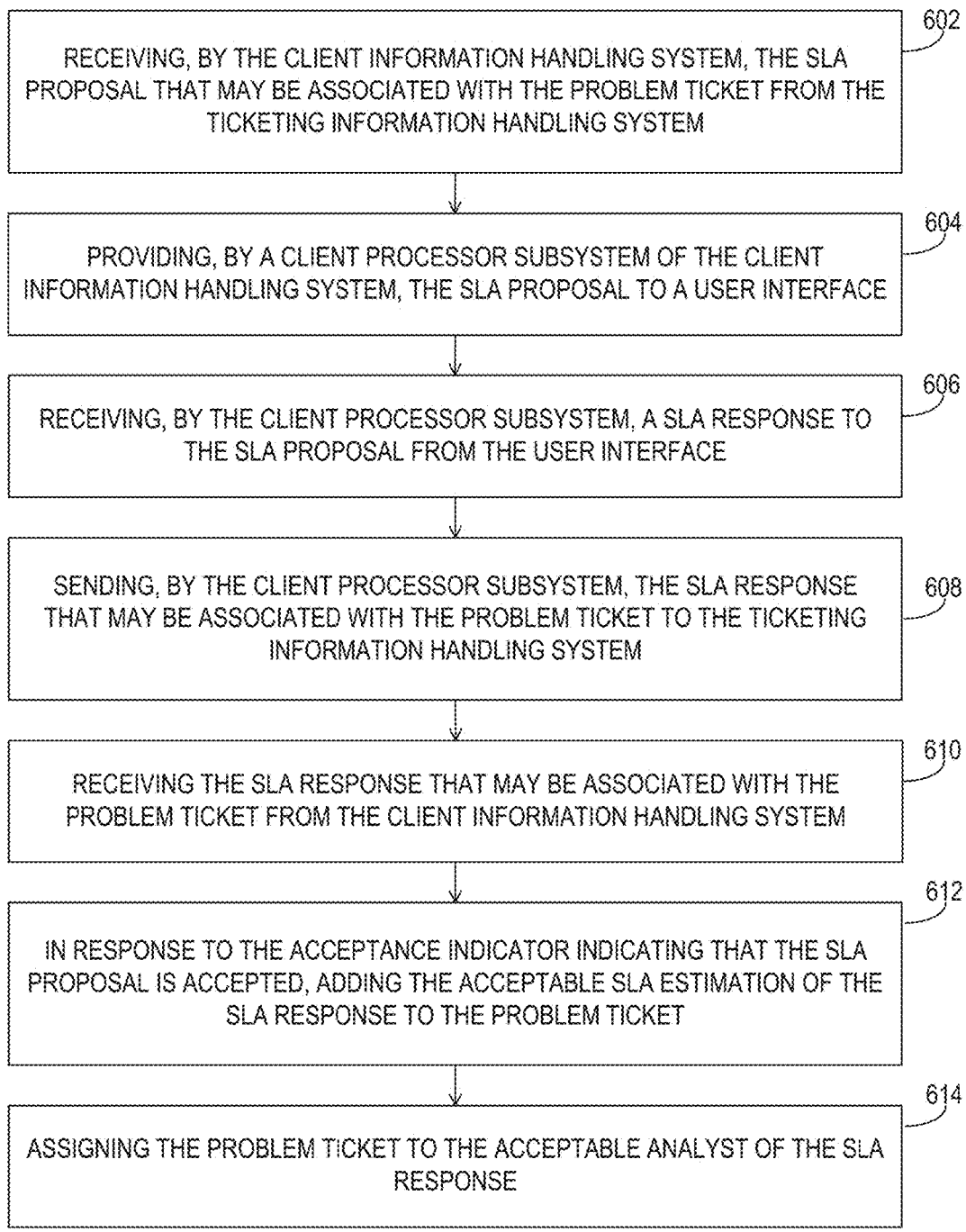
FIG. 6 is a flow chart of selected elements of a method for negotiating a service level agreement proposal associated with a problem ticket.

Referring now to FIG. 6, a flow chart of selected elements of a method 600 for negotiating a service level agreement proposal associated with a problem ticket, as described herein, is depicted in flowchart form. Method 600 may be performed using client information handling system 100-1, in conjunction with a ticketing information handling system 100-2 (see FIGS. 1 and 2) and, in particular, by client processor subsystem 120-1. It is noted that certain operations described in method 600 may be optional or may be rearranged in different embodiments.

Method 600 may begin at step 602, by a client information handling system receiving a SLA proposal that may be associated with a problem ticket from a ticketing information handling system. At step 604, a client processor subsystem of the client information handling system may provide the SLA proposal to a user interface. At step 606, the client processor subsystem may receive a SLA response to the SLA proposal from the user interface. At step 608, the client processor subsystem may send the SLA response that may be associated with the problem ticket to the ticketing information handling system. The SLA response may include an acceptance indicator, an acceptable analyst of the list of the pre-determined number of the recommended analysts, and an acceptable SLA estimation, the user interface may be associated with an application, and the client processor subsystem may include the application. At step 610, the ticketing information handling system may receive the SLA response that may be associated with the problem ticket from the client information handling system. At step 612, a ticketing processor subsystem of the ticketing information handling system may, in response to the acceptance indicator indicating that the SLA proposal is accepted, add the acceptable SLA estimation of the SLA response to the problem ticket. At step 614, the ticketing processor subsystem may assign the problem ticket to the acceptable analyst of the SLA response.

Referring now to FIG. 7, a flow chart of selected elements of a method 700 for building learned problem profiles, as described herein, is depicted in flowchart form. Method 700 may be performed using ticketing information handling system 100-2 (see FIGS. 1 and 2) and, in particular, by ticketing processor subsystem 120-2 and a categorization module 354 executed by a processor of the ticketing processor subsystem 120-2. It is noted that certain operations described in method 700 may be optional or may be rearranged in different embodiments.

Method 700 may begin at step 702, by a ticketing processor subsystem creating a first problem profile pattern for the problem of the problem ticket that may be based on problem information of the problem ticket and a categorization algorithm. At step 704, the ticketing processor subsystem may determine whether the first problem profile pattern has a known learned problem profile pattern that may be associated with a known learned problem profile of the learned problem profile database, prior to the identification of the learned problem profile of the learned problem profile database. At step 706, the ticketing processor subsystem may add the problem ticket to the known learned problem profile, in response to determining that the first problem profile pattern may have the known learned problem profile pattern. At step 708, the ticketing processor subsystem may add a new learned problem profile that may have the problem ticket and the first problem profile pattern to the learned problem profile database, in response to determining that the first problem profile pattern may have an unknown learned problem profile pattern. The categorization algorithm may be implemented by a categorization module of the ticketing processor subsystem.

Referring now to FIG. 8, a flow chart of selected elements of a method 800 for building learned analyst profiles, as described herein, is depicted in flowchart form. Method 800 may be performed using ticketing information handling system 100-2 (see FIGS. 1 and 2) and, in particular, by ticketing processor subsystem 120-2 and a rank ordering module 356 executed by a processor of the ticketing processor subsystem 120-2. It is noted that certain operations described in method 800 may be optional or may be rearranged in different embodiments.

Method 800 may begin at step 802, by a ticketing processor subsystem of a ticketing information handling system, for each of one or more completed problem tickets in an operational database, retrieving an assigned analyst, analyst information that may be associated with the assigned analyst, a known learned problem profile in the learned problem profile database that may be associated with the completed problem ticket, and performance metrics that may be associated with the assigned analyst and the completed problem ticket from the operational database. At step 804, for each of one or more completed problem tickets in an operational database, the ticketing processor subsystem may add the analyst information, a cross-reference to the known learned problem profile, and the performance metrics to a learned analyst profile in the learned analyst profile database that may be associated with the assigned analyst. At step 806, for each of one or more completed problem tickets in an operational database, the ticketing processor subsystem may order the learned analyst profiles that may be associated with the known learned problem profile from a highest rank order value to a lowest rank order value to create the rank ordered learned analyst profiles, that may be based on the performance metrics of the learned analyst profile, the performance metrics of each of the other learned analyst profiles, and a rank ordering algorithm. At step 808, for each of one or more completed problem tickets in an operational database, the ticketing processor subsystem may add a cross-reference of the learned analyst profile and a cross-reference of the rank ordered learned analyst profiles to the known learned problem profile. The operational database may be coupled to the ticketing information handling system and the rank ordering algorithm may be implemented by a rank ordering module of the ticketing processor subsystem.

Figure 9:
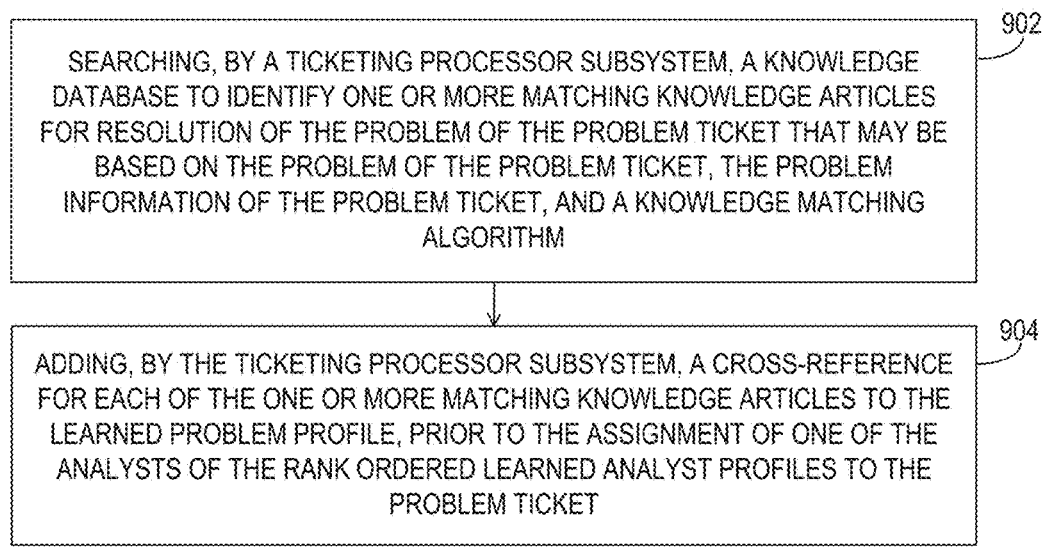
FIG. 9 is a flow chart of selected elements of a method for searching a knowledge database to identify knowledge articles for resolution of a problem.

Referring now to FIG. 9, a flow chart of selected elements of a method 900 for searching a knowledge database to identify knowledge articles for resolution of a problem, as described herein, is depicted in flowchart form. Method 900 may be performed using ticketing information handling system 100-2 (see FIGS. 1 and 2) and, in particular, by ticketing processor subsystem 120-2. It is noted that certain operations described in method 900 may be optional or may be rearranged in different embodiments.

Method 900 may begin at step 902, by a ticketing processor subsystem searching a knowledge database to identify one or more matching knowledge articles for resolution of the problem of the problem ticket that may be based on the problem of the problem ticket, the problem information of the problem ticket, and a knowledge matching algorithm. At step 904, the ticketing processor subsystem may add a cross-reference for each of the one or more matching knowledge articles to the learned problem profile, prior to the assignment of one of the analysts of the rank ordered learned analyst profiles to the problem ticket. The knowledge database may be coupled to the ticketing information handling system and may include one or more knowledge articles, each knowledge article may include instructions for resolution of a completed problem ticket. The knowledge matching algorithm may be implemented by a knowledge matching module of the ticketing information handling system.

Referring now to FIG. 10, a flow chart of selected elements of a method 1000 for creating an ordered list of learned analyst profiles, as described herein, is depicted in flowchart form. Method 1000 may be performed using ticketing information handling system 100-2, and in particular, by ticketing processor subsystem 120-2 and a rank ordering module 356 executed by a processor of the ticketing processor subsystem 120-2. It is noted that certain operations described in method 1000 may be optional or may be rearranged in different embodiments.

Method 1000 may begin at step 1002, by a ticketing processor subsystem of a ticketing information handling system creating an ordered list of learned analyst profiles that may be associated with a learned problem profile of analysts that are available to resolve a problem, that may be based on a rank ordering algorithm and performance metrics that may be associated with each analyst and each learned problem of learned problems of the learned problem profile. At step 1004, the ticketing processor subsystem may create a list of a pre-determined number of recommended analysts of the learned analyst profiles from the pre-determined number of the learned analyst profiles of the ordered list that may have the highest rank order values. The ordered list of the learned analyst profiles may be ordered from a learned analyst profile having a highest rank order value to a learned analyst profile having a lowest rank order value, the rank ordering algorithm may be implemented by a rank ordering module, and the ticketing processor subsystem may further include the rank ordering module.

Figure 11:
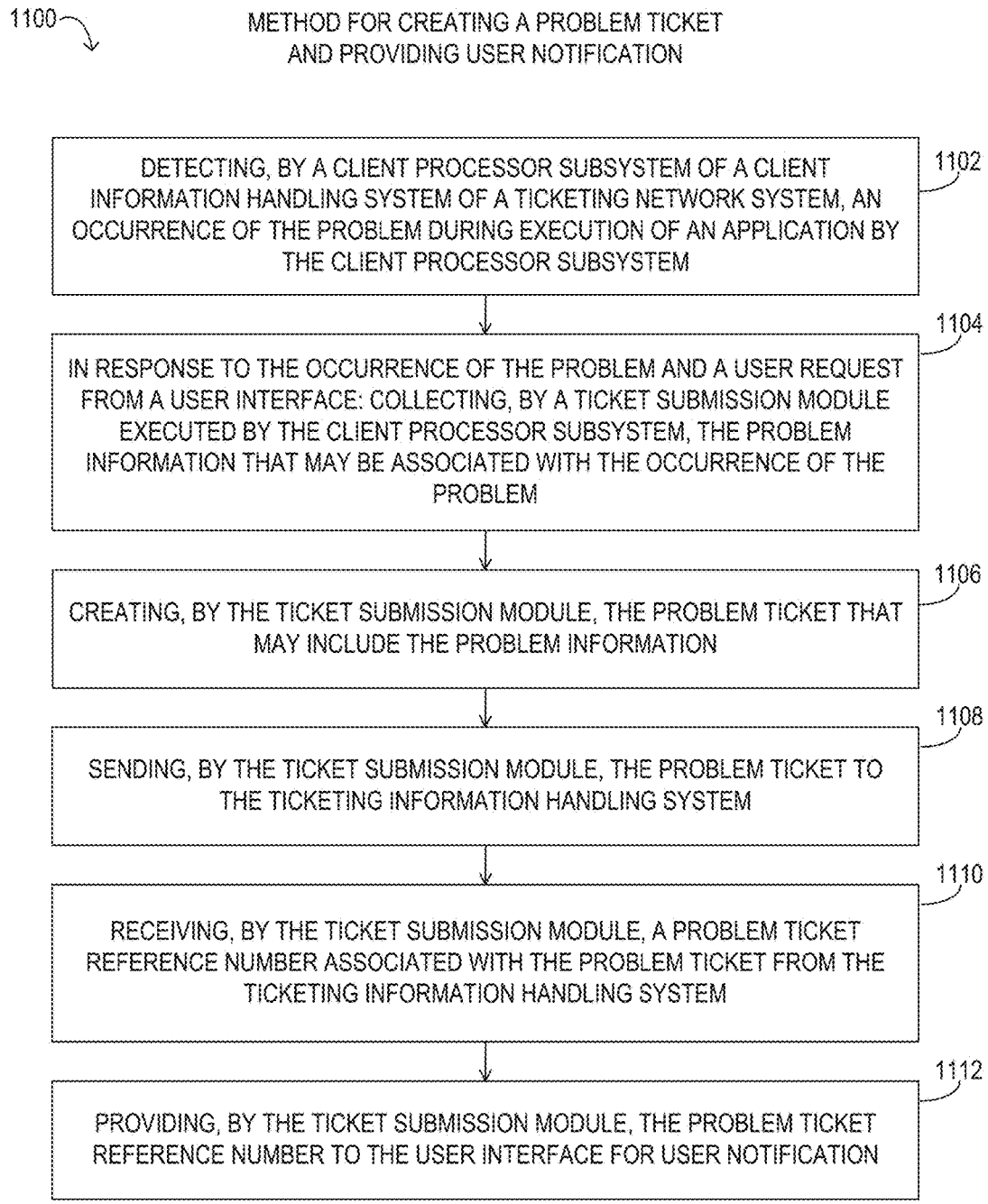
FIG. 11 is a flow chart of selected elements of a method for creating a problem ticket and user notification.

Referring now to FIG. 11, a flow chart of selected elements of a method 1100 for creating a problem ticket and user notification, as described herein, is depicted in flowchart form. Method 1100 may be performed using client information handling system 100-1 (see FIGS. 1 and 2) and, in particular, by client processor subsystem 120-1 and a ticket submission module 334 executed by a processor of processor subsystem 120-1. It is noted that certain operations described in method 1100 may be optional or may be rearranged in different embodiments.

Method 1100 may begin at step 1102, by a client processor subsystem of the client information handling system detecting an occurrence of a problem during execution of an application by the client processor subsystem. At step 1104, a ticket submission module executed by the client processor subsystem, in response to the occurrence of the problem and a user request from a user interface, may collect problem information that may be associated with the occurrence of the problem. At step 1106, the ticket submission module, in response to the occurrence of the problem and a user request from a user interface, may create the problem ticket that may include the problem information. At step 1108, the ticket submission module, in response to the occurrence of the problem and a user request from a user interface, may send the problem ticket to the ticketing information handling system. At step 1110, the ticket submission module, in response to the occurrence of the problem and a user request from a user interface, may receive a problem ticket reference number associated with the problem ticket from the ticketing information handling system. At step 1112, the ticket submission module, in response to the occurrence of the problem and a user request from a user interface, may provide the problem ticket reference number to the user interface for user notification. The client processor subsystem may further include the application and the ticket submission module. The application and the ticket submission module may be associated with the user interface.

As disclosed herein, systems and methods for machine suggested dynamic real time service level agreements in operations may include a client information handling system and a ticketing information handling system having a ticketing processor subsystem. The ticketing processor subsystem may receive a problem ticket that may include a problem from the client information handling system. The ticketing processor subsystem may identify a learned problem profile, which may be based on the problem ticket, and learned analyst profiles associated with the learned problem profile. The ticketing processor subsystem may also determine a SLA estimation, which may be based on the learned problem profile and the learned analyst profiles. The ticketing processor subsystem may also send a SLA proposal that may include the SLA estimation and recommended analysts to the client information handling system.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A ticketing system, comprising:
   a client information handling system; and
   a ticketing information handling system coupled to the client information handling system, a learned problem profile database, and a learned analyst profile database of the ticketing system, the ticketing information handling system including a ticketing processor subsystem configured to:
      receive a problem ticket including a problem and problem information associated with the problem from the client information handling system;
      identify a learned problem profile based on the problem information of the problem ticket and a categorization algorithm;
      identify learned analyst profiles of the learned analyst profile database associated with the learned problem profile;
      determine a service level agreement (SLA) estimation based on the learned problem profile, the learned analyst profiles associated with the learned problem profile, and a SLA estimation algorithm;
      determine a list of a pre-determined number of recommended analysts of the learned analyst profiles;
      send a SLA proposal associated with the problem ticket to the client information handling system, wherein the SLA proposal includes the SLA estimation and the list of the pre-determined number of recommended analysts, the categorization algorithm to be implemented by a categorization module, the SLA estimation algorithm to be implemented by a SLA estimation module, the ticketing processor subsystem includes the categorization module and the SLA estimation module, and the ticketing system includes the learned problem profile database and the learned analyst profile database; and
      receive a SLA response associated with the SLA proposal from the client information handling system, wherein the SLA response includes an acceptance indicator, an acceptable analyst of the list of the pre-determined number of the recommended analysts, and an acceptable SLA estimation.

2. The ticketing system of claim 1, wherein the SLA estimation is further based on an average resolution time of the problem, a product available time of product information of a product information database, an available time of each analyst of the learned analyst profiles, a resolution time of each analyst available to resolve the problem, user information associated with a user and the problem ticket, and analyst information associated with each analyst, and wherein the ticketing system includes the product information database.

3. The ticketing system of claim 1, the ticketing processor subsystem further configured to:

retrieve the learned analyst profiles from a correlation database entry of a correlation database associated with the learned problem profile, prior to the identification of the learned analyst profiles, wherein the ticketing system includes the correlation database.

4. The ticketing system of claim 1, the ticketing processor subsystem further configured to:

create an ordered list of the learned analyst profiles associated with the learned problem profile of analysts that are available to resolve the problem, based on a rank ordering algorithm and performance metrics associated with each analyst and each learned problem of the learned problems of the learned problem profile; and create the list of the pre-determined number of the recommended analysts of the learned analyst profiles from the pre-determined number of the learned analyst profiles of the ordered list having the highest rank order values, wherein the ordered list of the learned analyst profiles is ordered from a learned analyst profile having a highest rank order value to a learned analyst profile having a lowest rank order value, the rank ordering algorithm to be implemented by a rank ordering module, and the ticketing processor subsystem further includes the rank ordering module.

5. The ticketing system of claim 1, the client information handling system further comprising a client processor subsystem configured to:

receive the SLA proposal associated with the problem ticket from the ticketing information handling system;

provide the SLA proposal to a user interface, the user interface associated with an application executed by the client processor subsystem;

receive the SLA response to the SLA proposal from the user interface; and send the SLA response associated with the problem ticket to the ticketing information handling system.

6. The ticketing system of claim 5, the ticketing processor subsystem further configured to:

receive the SLA response associated with the problem ticket from the client information handling system; and in response to the acceptance indicator indicating that the SLA proposal is accepted:

add the acceptable SLA estimation of the SLA response to the problem ticket; and assign the problem ticket to the acceptable analyst of the SLA response.

7. The ticketing system of claim 1, wherein the problem information comprises one or more of:

an error message;
an error code;
an exception code;
a screenshot of information displayed by a user interface on a display of the client information handling system;
a page name and a page header of the information displayed by the user interface on the display;
a transaction name;

a product name;
a business process name;
a business domain name;
a problem severity;
a submission time;
a selected problem priority;
an accepted problem priority;
an adjusted SLA; and
an accepted SLA.

8. The ticketing system of claim 4, wherein the performance metrics comprise one or more of:

a customer satisfaction score;
a service level agreement metric; and
a reoccurrence metric.

9. The ticketing system of claim 2, wherein the analyst information comprises one or more of:

a business domain;
shift information;
a time zone;
a holiday zone;
a start date;
a current work load; and
a next available time.

10. The ticketing system of claim 2, wherein the product information comprises one or more of:

a business domain;
a current status;
a product available time; and
a list of systems, each of the systems including:
  learned problem profile resolution capabilities;
  a system status; and
  system availability information; and
wherein the user information comprises one or more of:
a business domain;
shift information;
a time zone;
a holiday zone;
contact information;
analyst preferences;
a next available time; and
a SLA associated with a user.

11. A method, comprising:

receiving, by a ticketing information handling system of a ticketing system, a problem ticket including a problem and problem information associated with the problem from a client information handling system of the ticketing system, wherein the ticketing information handling system coupled to the client information handling system, the ticketing information handling system further coupled to a learned problem profile database and a learned analyst profile database of the ticketing system;

identifying, by a ticketing processor subsystem of the ticketing information handling system, a learned problem profile based on the problem information of the problem ticket and a categorization algorithm;

identifying, by the ticketing processor subsystem, learned analyst profiles of the learned analyst profile database associated with the learned problem profile;

determining, by the ticketing processor subsystem, a SLA estimation based on the learned problem profile, the learned analyst profiles associated with the learned problem profile, and a SLA estimation algorithm;

determining, by the ticketing processor subsystem, a list of a pre-determined number of recommended analysts of the learned analyst profiles;

sending, by the ticketing processor subsystem, a SLA proposal associated with the problem ticket to the client information handling system, wherein the SLA proposal includes the SLA estimation and the list of the pre-determined number of recommended analysts, the categorization algorithm to be implemented by a categorization module, the SLA estimation algorithm to be implemented by a SLA estimation module, the ticketing processor subsystem includes the categorization module and the SLA estimation module, and the ticketing system includes the learned problem profile database and the learned analyst profile database; and receiving, by the ticketing processor subsystem, a SLA response associated with the SLA proposal from the client information handling system, wherein the SLA response includes an acceptance indicator, an acceptable analyst of the list of the pre-determined number of the recommended analysts, and an acceptable SLA estimation.

12. The method of claim 11, wherein the SLA estimation is further based on an average resolution time of the problem, a product available time of product information of a product information database, an available time of each analyst of the learned analyst profiles, a resolution time of each analyst available to resolve the problem, user information associated with a user and the problem ticket, and analyst information associated with each analyst, and
   wherein the ticketing system includes the product information database.

13. The method of claim 11, further comprising:
retrieving the learned analyst profiles from a correlation database entry of a correlation database associated with the learned problem profile, prior to the identification of the learned analyst profiles,
wherein the ticketing system includes the correlation database.

14. The method of claim 11, further comprising:
creating an ordered list of the learned analyst profiles associated with the learned problem profile of analysts that are available to resolve the problem, based on a rank ordering algorithm and performance metrics associated with each analyst and each learned problem of the learned problems of the learned problem profile; and
creating the list of the pre-determined number of the recommended analysts of the learned analyst profiles from the pre-determined number of the learned analyst profiles of the ordered list having the highest rank order values,
wherein the ordered list of the learned analyst profiles is ordered from a learned analyst profile having a highest rank order value to a learned analyst profile having a lowest rank order value, the rank ordering algorithm to be implemented by a rank ordering module, and the ticketing processor subsystem further includes the rank ordering module.

15. The method of claim 11, further comprising:
receiving, by the client information handling system, the SLA proposal associated with the problem ticket from the ticketing information handling system;
providing, by a client processor subsystem of the client information handling system, the SLA proposal to a user interface, the user interface associated with an application executed by the client processor subsystem;
receiving, by the client processor subsystem, the SLA response to the SLA proposal from the user interface; and sending, by the client processor subsystem, the SLA response associated with the problem ticket to the ticketing information handling system.

16. The method of claim 15, further comprising:
receiving the SLA response associated with the problem ticket from the client information handling system; and
in response to the acceptance indicator indicating that the SLA proposal is accepted:
   adding the acceptable SLA estimation of the SLA response to the problem ticket; and
   assigning the problem ticket to the acceptable analyst of the SLA response.

17. The method of claim 11, wherein the problem information comprises one or more of:
an error message;
an error code;
an exception code;
a screenshot of information displayed by a user interface on a display of the client information handling system;
a page name and a page header of the information displayed by the user interface on the display;
a transaction name;
a product name;
a business process name;
a business domain name;
a problem severity;
a submission time;
a selected problem priority;
an accepted problem priority;
an adjusted SLA; and
an accepted SLA.

18. The method of claim 14, wherein the performance metrics comprise one or more of:
a customer satisfaction score;
a service level agreement metric; and
a reoccurrence metric.

19. The method of claim 12, wherein the analyst information comprises one or more of:
a business domain;
shift information;
a time zone;
a holiday zone;
a start date;
a current work load; and
a next available time.

20. The method of claim 12, wherein the product information comprises one or more of:
a business domain;
a current status;
a product available time; and
a list of systems, each of the systems including:
   learned problem profile resolution capabilities;
   a system status; and
   system availability information; and
wherein the user information comprises one or more of:
a business domain;
shift information;
a time zone;
a holiday zone;
contact information;
analyst preferences;
a next available time; and
a SLA associated with a user.

* * * * *